US010062931B2

(12) United States Patent
Tyler et al.

(10) Patent No.: US 10,062,931 B2
(45) Date of Patent: Aug. 28, 2018

(54) WELDING PROCESS FOR BATTERY MODULE COMPONENTS

(71) Applicant: Johnson Controls Technology Company, Holland, MI (US)

(72) Inventors: Matthew R. Tyler, Brown Deer, WI (US); Jennifer L. Czarnecki, Franklin, WI (US); Christopher M. Bonin, Glendale, WI (US)

(73) Assignee: Johnson Controls Technology Company, Auburn Hills, MI (US)

( * ) Notice: Subject to any disclaimer, the term of this patent is extended or adjusted under 35 U.S.C. 154(b) by 111 days.

(21) Appl. No.: 14/872,049

(22) Filed: Sep. 30, 2015

(65) Prior Publication Data
US 2016/0315359 A1    Oct. 27, 2016

Related U.S. Application Data

(60) Provisional application No. 62/151,177, filed on Apr. 22, 2015.

(51) Int. Cl.
*H01M 10/48* (2006.01)
*H01M 2/20* (2006.01)

(52) U.S. Cl.
CPC ......... *H01M 10/482* (2013.01); *H01M 2/202* (2013.01); *H01M 2/206* (2013.01); *H01M 10/486* (2013.01); *H01M 2220/20* (2013.01)

(58) Field of Classification Search
CPC ...... H01M 10/48; H01M 10/482; H01M 2/20; H01M 2/206
See application file for complete search history.

(56) References Cited

U.S. PATENT DOCUMENTS

| 7,180,726 | B2 | 2/2007 | Thrap |
| 7,504,179 | B2 | 3/2009 | Tanjou et al. |
| 7,659,029 | B2 | 2/2010 | Ota et al. |
| 7,923,144 | B2 | 4/2011 | Kohn et al. |
| 8,114,540 | B2 | 2/2012 | Trester et al. |
| 8,420,251 | B2 | 4/2013 | Watanabe et al. |
| 8,551,638 | B2 | 10/2013 | Khakhalev et al. |
| 8,564,244 | B2 | 10/2013 | Tillmann et al. |

(Continued)

FOREIGN PATENT DOCUMENTS

| EP | 3054503 | 8/2016 |
| JP | 2000107872 | 4/2000 |

OTHER PUBLICATIONS

PCT/US2016/017915 Search Report and Written Opinion dated May 31, 2016.

*Primary Examiner* — Karie O'Neill Apicella
(74) *Attorney, Agent, or Firm* — Fletcher Yoder, P.C.

(57) ABSTRACT

The present disclosure relates to a battery module that includes a stack of battery cells disposed in a housing, where each battery cell of the stack of battery cells has a terminal, and a bus bar having a body and an indicator disposed on the body, where the bus bar is configured to couple a first terminal of a first battery cell of the stack of battery cells to a second terminal of a second battery cell of the stack of battery cells. The battery module also includes a sensing component disposed on the indicator and configured to monitor a condition of at least one battery cell of the stack of battery cells and a weld physically and electrically coupling the sensing component to the bus bar.

25 Claims, 9 Drawing Sheets

(56) References Cited

U.S. PATENT DOCUMENTS

| | | |
|---|---|---|
| 8,586,230 B2 | 11/2013 | Kim et al. |
| 8,709,636 B2 | 4/2014 | Oury |
| 8,859,133 B2 | 10/2014 | Oury |
| 9,017,842 B2 | 4/2015 | Park et al. |
| 9,105,912 B2 * | 8/2015 | Zhao ................... H01M 2/266 |
| 9,196,890 B2 | 11/2015 | Kim et al. |
| 9,225,035 B1 | 12/2015 | Werre et al. |
| 9,246,145 B2 | 1/2016 | Watanabe et al. |
| 9,252,466 B2 | 2/2016 | Norton |
| 2009/0212779 A1 | 8/2009 | Wenger |
| 2010/0190055 A1 | 7/2010 | Khakhalev |
| 2011/0248069 A1 | 10/2011 | Khakhalev et al. |
| 2013/0280587 A1 | 10/2013 | Kim |
| 2014/0255750 A1 | 9/2014 | Jan et al. |
| 2014/0356671 A1 | 12/2014 | Dawley et al. |
| 2014/0363711 A1 | 12/2014 | Zhao |
| 2014/0370366 A1 | 12/2014 | Higuchi et al. |
| 2015/0171405 A1 | 6/2015 | Lee |
| 2015/0372354 A1 * | 12/2015 | Nakano ................. H01M 2/206 429/90 |
| 2016/0056430 A1 | 2/2016 | Burkman |
| 2016/0141585 A1 | 5/2016 | Berg et al. |
| 2016/0197332 A1 | 7/2016 | Lee et al. |

\* cited by examiner

WELDING PROCESS FOR BATTERY MODULE COMPONENTS

CROSS-REFERENCE TO RELATED APPLICATION

This application claims priority from and the benefit of U.S. Provisional Application Ser. No. 62/151,177, filed Apr. 22, 2015, entitled "CELL BUS BAR TO VOLTAGE AND TEMPERATURE SENSE ULTRASONIC WELDING AND BARE COPPER WIRE TO NICKEL PLATED ALUMINUM BUS BAR," which is hereby incorporated by reference in its entirety for all purposes.

BACKGROUND

The present disclosure relates generally to the field of batteries and battery modules. More specifically, the present disclosure relates to a welding process for sensing components of a battery module.

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be understood that these statements are to be read in this light, and not as admissions of prior art.

A vehicle that uses one or more battery systems for providing all or a portion of the motive power for the vehicle can be referred to as an xEV, where the term "xEV" is defined herein to include all of the following vehicles, or any variations or combinations thereof, that use electric power for all or a portion of their vehicular motive force. For example, xEVs include electric vehicles (EVs) that utilize electric power for all motive force. As will be appreciated by those skilled in the art, hybrid electric vehicles (HEVs), also considered xEVs, combine an internal combustion engine propulsion system and a battery-powered electric propulsion system, such as 48 Volt (V) or 130V systems. The term HEV may include any variation of a hybrid electric vehicle. For example, full hybrid systems (FHEVs) may provide motive and other electrical power to the vehicle using one or more electric motors, using only an internal combustion engine, or using both. In contrast, mild hybrid systems (MHEVs) disable the internal combustion engine when the vehicle is idling and utilize a battery system to continue powering the air conditioning unit, radio, or other electronics, as well as to restart the engine when propulsion is desired. The mild hybrid system may also apply some level of power assist, during acceleration for example, to supplement the internal combustion engine. Mild hybrids are typically 96V to 130V and recover braking energy through a belt or crank integrated starter generator. Further, a micro-hybrid electric vehicle (mHEV) also uses a "Stop-Start" system similar to the mild hybrids, but the micro-hybrid systems of a mHEV may or may not supply power assist to the internal combustion engine and operate at a voltage below 60V. For the purposes of the present discussion, it should be noted that mHEVs typically do not technically use electric power provided directly to the crankshaft or transmission for any portion of the motive force of the vehicle, but an mHEV may still be considered as an xEV since it does use electric power to supplement a vehicle's power needs when the vehicle is idling with internal combustion engine disabled and recovers braking energy through an integrated starter generator. In addition, a plug-in electric vehicle (PEV) is any vehicle that can be charged from an external source of electricity, such as wall sockets, and the energy stored in the rechargeable battery packs drives or contributes to drive the wheels. PEVs are a subcategory of EVs that include all-electric or battery electric vehicles (BEVs), plug-in hybrid electric vehicles (PHEVs), and electric vehicle conversions of hybrid electric vehicles and conventional internal combustion engine vehicles.

xEVs as described above may provide a number of advantages as compared to more traditional gas-powered vehicles using only internal combustion engines and traditional electrical systems, which are typically 12V systems powered by a lead acid battery. For example, xEVs may produce fewer undesirable emission products and may exhibit greater fuel efficiency as compared to traditional internal combustion vehicles and, in some cases, such xEVs may eliminate the use of gasoline entirely, as is the case of certain types of EVs or PEVs.

As technology continues to evolve, there is a need to provide improved power sources, particularly battery modules, for such vehicles. For example, in traditional configurations, battery modules may include sensing components configured to monitor a condition of one or more battery cells of the battery module. The sensing components may include temperature sense components and voltage sense components, among others. However, placing the sensing components in the battery module may be time consuming. Additionally, in certain implementations, the sensing components may be subject to various mechanical stresses. These stresses can cause sensing components coupled to various monitoring locations in the battery module to become weak or generally ineffective. It is now recognized that an enhanced welding process enabling robust connections of sensing components to monitoring locations in a battery module is desired.

SUMMARY

A summary of certain embodiments disclosed herein is set forth below. It should be understood that these aspects are presented merely to provide the reader with a brief summary of certain embodiments and that these aspects are not intended to limit the scope of this disclosure. Indeed, this disclosure may encompass a variety of aspects that may not be set forth below.

The present disclosure relates to a battery module that includes a stack of battery cells disposed in a housing, where each battery cell of the stack of battery cells has a terminal, and a bus bar having a body and an indicator disposed on the body, where the bus bar is configured to couple a first terminal of a first battery cell of the stack of battery cells to a second terminal of a second battery cell of the stack of battery cells. The battery module also includes a sensing component disposed on the indicator and configured to monitor a condition of at least one battery cell of the stack of battery cells and a weld physically and electrically coupling the sensing component to the bus bar.

The present disclosure also relates to a battery module that includes a stack of battery cells disposed in a housing, where each battery cell of the stack of battery cells includes a terminal on a terminal end of each battery cell. The battery module also includes a bus bar having a body and an indicator disposed on the body, where the bus bar is configured to couple a first terminal of a first battery cell of the stack of battery cells to a second terminal of a second battery cell of the stack of battery cells. Additionally, the battery module includes a sensing component disposed on the indicator and configured to monitor a condition of at least one battery cell of the stack of battery cells, a carrier configured to receive and secure the bus bar and the sensing component, and a weld physically and electrically coupling the sensing component to the bus bar. The weld is formed according to a process that includes disposing the bus bar in the carrier, disposing the sensing component in the carrier and over the indicator of the bus bar, directing ultrasonic vibrations toward a first surface of the bus bar via an anvil, oscillating the anvil in a direction parallel to a length of the sensing component, and melting at least a portion of the bus bar, the sensing component, or both, to form a molten material such that the molten material re-hardens and couples the sensing component to the bus bar.

The present disclosure also relates to a method for manufacturing a battery module that includes disposing a bus bar in a carrier, disposing a sensing component in the carrier and over an indicator positioned on a body of the bus bar, where the indicator is positioned on a first surface of the bus bar, directing ultrasonic vibrations toward a second surface of the bus bar via an anvil, oscillating the anvil in a direction parallel to a length of the sensing component, and melting at least a portion of the bus bar, the sensing component, or both, to form a molten material such that the molten material re-hardens and couples the sensing component to the bus bar.

DRAWINGS

Various aspects of this disclosure may be better understood upon reading the following detailed description and upon reference to the drawings in which.

Figure 13:
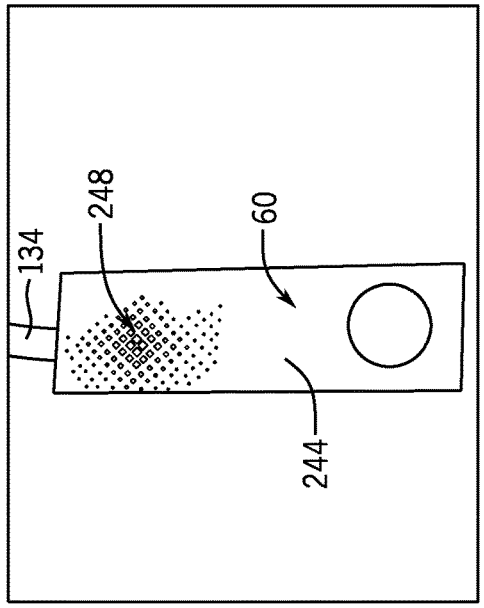
Figure 15:
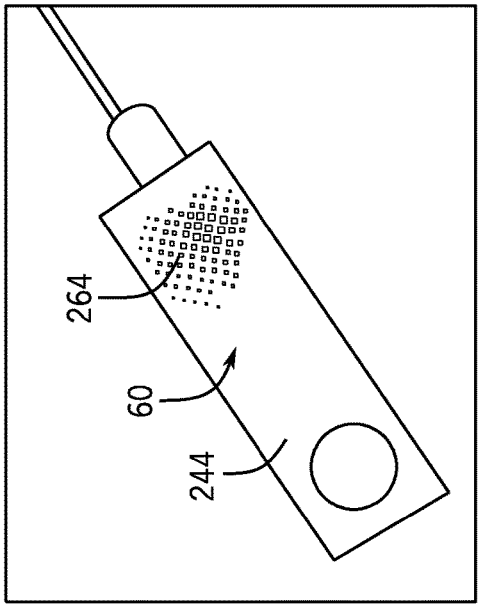
Figure 12:
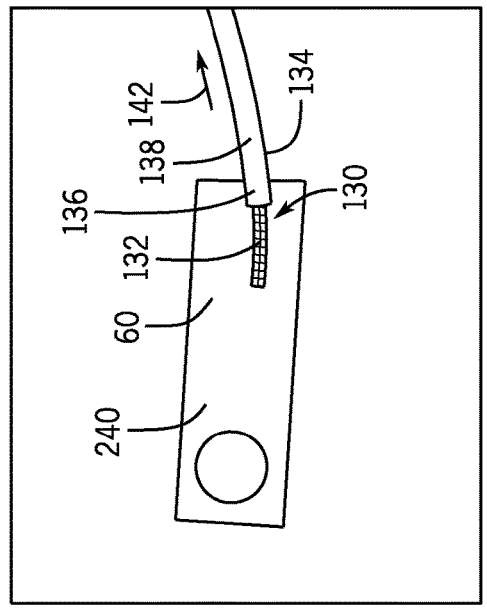
Figure 14:
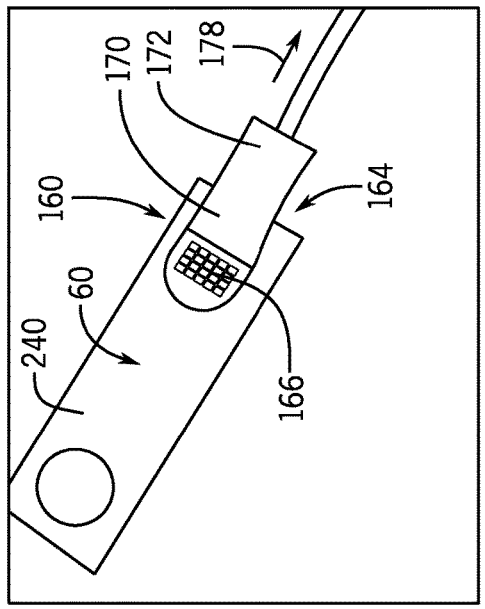

FIGS. 12 and 13 are pictorial representations of first and second surfaces of an embodiment of the bus bar and depict an example of the enhanced weld formed between the bus bar and the voltage sense component, in accordance with an aspect of the present disclosure; and FIGS. 14 and 15 are pictorial representations of the first and second surfaces of an embodiment of the bus bar and depict an example of the enhanced weld formed between the bus bar and the temperature sense component, in accordance with an aspect of the present disclosure.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The battery systems described herein may be used to provide power to various types of electric vehicles (xEVs) and other high voltage energy storage/expending applications (e.g., electrical grid power storage systems). Such battery systems may include one or more battery modules, each battery module having a number of battery cells (e.g., lithium-ion (Li-ion) electrochemical cells) arranged and electrically interconnected to provide particular voltages and/or currents useful to power, for example, one or more components of an xEV. As another example, battery modules in accordance with present embodiments may be incorporated with or provide power to stationary power systems (e.g., non-automotive systems).

Battery modules may include one or more battery cells (e.g., electrochemical battery cells) that may be subject to various electrical stresses such as overcharging and/or overheating, which may be undesirable. In addition, over time, the one or more battery cells may begin to experience a decline in electrical performance. Accordingly, battery modules may include sensing components to monitor the temperature and/or voltage (e.g., electrical measurements) of the one or more battery cells, for example, to determine whether the one or more battery cells are overcharged and/or overheated. The sensing components may be coupled to cabling configured to carry signals generated by the sensing components to a battery control unit, a battery management system ("BMS"), or another special purpose computing device (e.g., a vehicle control module (VCM)). For example, the sensing features may be electrically coupled to a battery control unit (e.g., via the cabling) and configured to send signals pertaining to a temperature or a voltage of the battery module over time. In certain embodiments, the battery control unit may initiate certain control actions (e.g., de-rate the battery module or stop an electrical flow) in response to determining that the temperature and/or electrical measurements exceed a threshold.

Battery modules in accordance with the present disclosure may include bus bars configured to couple a first battery cell of the battery module to a second battery cell of the battery module. The bus bar may be welded to a first terminal of the first battery cell and a second terminal of the second battery cell. Additionally, the sensing components may be coupled (e.g., welded) to a surface of the bus bar to monitor the temperature and/or voltage associated with the first and/or second battery cells. However, it is now recognized that coupling the sensing components to the bus bar after the bus bar has been welded to the first and second terminals may be complicated, time consuming, and expensive. It is also recognized that traditional welds between the sensing components and the bus bars may be relatively weak, which may eventually lead to inaccurate measurements received from the sensing components (or even disconnection). Thus, it is now recognized that an improved process for welding the sensing components to the bus bars may enhance a strength of the connection between the sensing components and the bus bars as well as simplify assembly of the battery module, thereby enhancing an efficiency of the manufacturing process.

The present disclosure addresses these and other shortcomings of traditional welding techniques. For example, embodiments of the present disclosure relate to a battery module that includes a bus bar carrier that may include various features to receive and secure the bus bars and/or the sensing components. Additionally, the bus bars may include an indicator that signals to an assembler where to position the sensing components. In accordance with present embodiments, the sensing components may be coupled to the bus bars prior to welding the bus bars to terminals of the one or more battery cells. Therefore, components of the bus bar carrier may be assembled before the bus bar carrier is disposed in a housing of the battery module, thereby facilitating assembly. Further, the sensing components may be welded to the bus bars via an ultrasonic welding process that may strengthen a connection between the bus bars and the sensing components, thereby enhancing the duration of the battery module. However, other types of welding (e.g., laser welding) are within the scope of the present disclosure.

Figure 1:
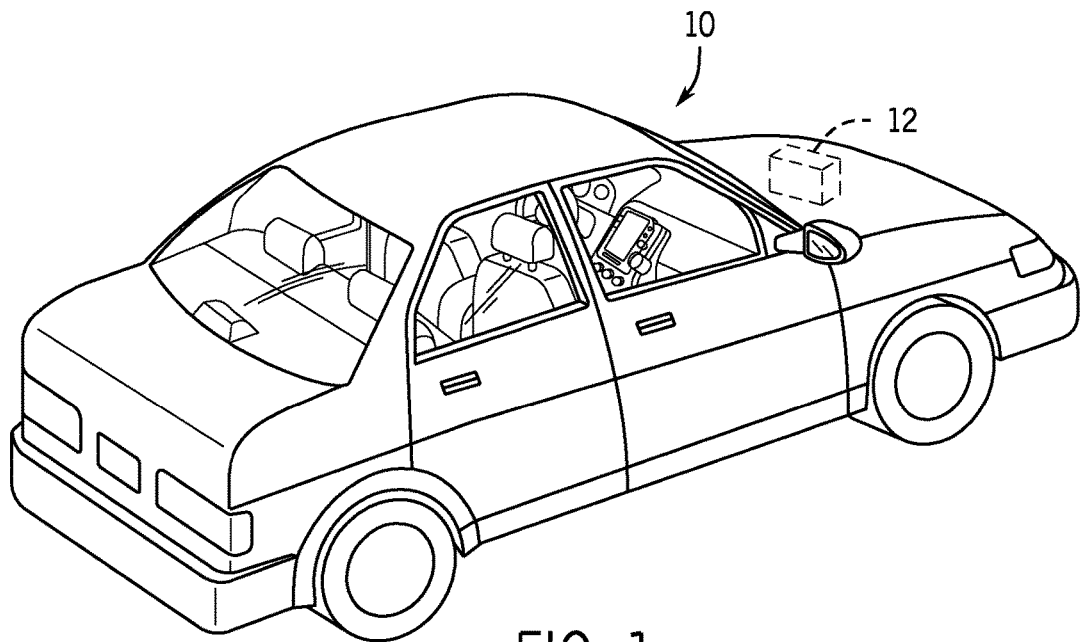
FIG. 1 is a perspective view of a vehicle having a battery system configured in accordance with present embodiments to provide power for various components of the vehicle, in accordance with an aspect of the present disclosure.

To help illustrate the manner in which the present embodiments may be used in a system, FIG. 1 is a perspective view of an embodiment of a vehicle 10 (e.g., an xEV), which may utilize a regenerative braking system. Although the following discussion is presented in relation to vehicles with regenerative braking systems, the techniques described herein are adaptable to other vehicles that capture/store electrical energy with a battery, which may include electric-powered and gas-powered vehicles.

As discussed above, it would be desirable for a battery system 12 to be largely compatible with traditional vehicle designs. Accordingly, the battery system 12 may be placed in a location in the vehicle 10 that would have housed a traditional battery system. For example, as illustrated, the vehicle 10 may include the battery system 12 positioned similarly to a lead-acid battery of a typical combustion-engine vehicle (e.g., under the hood of the vehicle 10).

Figure 2:
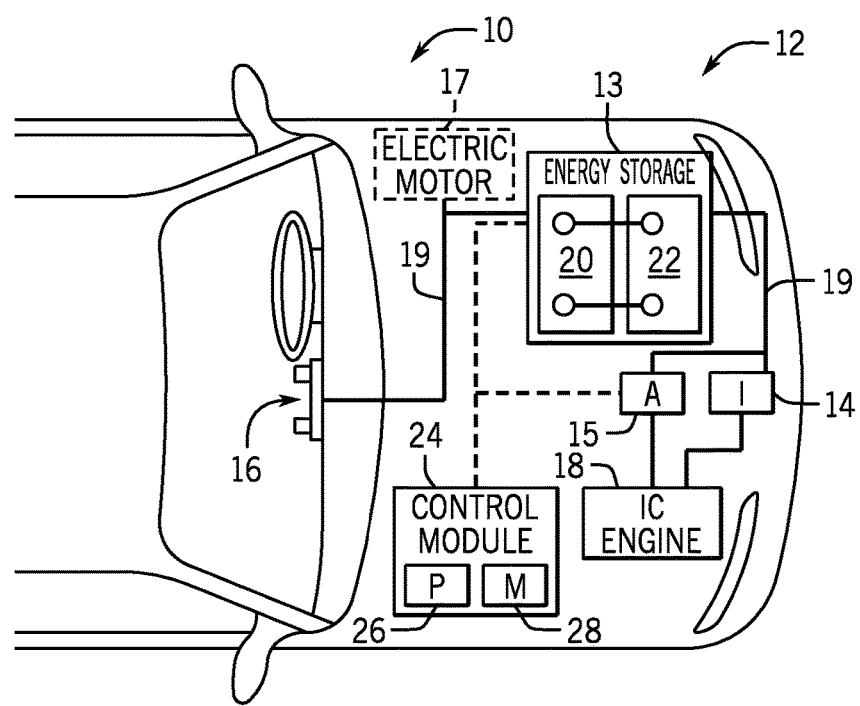
FIG. 2 is a cutaway schematic view of an embodiment of the vehicle and the battery system of FIG. 1, in accordance with an aspect of the present disclosure.

A more detailed view of the battery system 12 is described in FIG. 2. As depicted, the battery system 12 includes an energy storage component 13 coupled to an ignition system 14, an alternator 15, a vehicle console 16, and optionally to an electric motor 17. Generally, the energy storage component 13 may capture/store electrical energy generated in the vehicle 10 and output electrical energy to power electrical devices in the vehicle 10.

In other words, the battery system 12 may supply power to components of the vehicle's electrical system, which may include radiator cooling fans, climate control systems, electric power steering systems, active suspension systems, auto park systems, electric oil pumps, electric super/turbochargers, electric water pumps, heated windscreen/defrosters, window lift motors, vanity lights, tire pressure monitoring systems, sunroof motor controls, power seats, alarm systems, infotainment systems, navigation features, lane departure warning systems, electric parking brakes, external lights, or any combination thereof. Illustratively, in the depicted embodiment, the energy storage component 13 supplies power to the vehicle console 16 and the ignition system 14, which may be used to start (e.g., crank) an internal combustion engine 18.

Additionally, the energy storage component 13 may capture electrical energy generated by the alternator 15 and/or the electric motor 17. In some embodiments, the alternator 15 may generate electrical energy while the internal combustion engine 18 is running. More specifically, the alternator 15 may convert the mechanical energy produced by the rotation of the internal combustion engine 18 into electrical energy. Additionally or alternatively, when the vehicle 10 includes an electric motor 17, the electric motor 17 may generate electrical energy by converting mechanical energy produced by the movement of the vehicle 10 (e.g., rotation of the wheels) into electrical energy. Thus, in some embodiments, the energy storage component 13 may capture electrical energy generated by the alternator 15 and/or the electric motor 17 during regenerative braking. As such, the alternator 15 and/or the electric motor 17 are generally referred to herein as a regenerative braking system.

To facilitate capturing and supplying electric energy, the energy storage component 13 may be electrically coupled to the vehicle's electric system via a bus 19. For example, the bus 19 may enable the energy storage component 13 to receive electrical energy generated by the alternator 15 and/or the electric motor 17. Additionally, the bus 19 may enable the energy storage component 13 to output electrical energy to the ignition system 14 and/or the vehicle console 16. Accordingly, when a 12 volt battery system 12 is used, the bus 19 may carry electrical power typically between 8-18 volts.

Additionally, as depicted, the energy storage component 13 may include multiple battery modules. For example, in the depicted embodiment, the energy storage component 13 includes a lithium ion (e.g., a first) battery module 20 in accordance with present embodiments, and a lead-acid (e.g., a second) battery module 22, where each battery module 20, 22 includes one or more battery cells (e.g., individually sealed battery cells). In other embodiments, the energy storage component 13 may include any number of battery modules. Additionally, although the lithium ion battery module 20 and lead-acid battery module 22 are depicted adjacent to one another, they may be positioned in different areas around the vehicle. For example, the lead-acid battery module 22 may be positioned in or about the interior of the vehicle 10 while the lithium ion battery module 20 may be positioned under the hood of the vehicle 10.

In some embodiments, the energy storage component 13 may include multiple battery modules to utilize multiple different battery chemistries. For example, when the lithium ion battery module 20 is used, performance of the battery system 12 may be improved since the lithium ion battery chemistry generally has a higher coulombic efficiency and/or a higher power charge acceptance rate (e.g., higher maximum charge current or charge voltage) than the lead-acid battery chemistry. As such, the capture, storage, and/or distribution efficiency of the battery system 12 may be improved.

To facilitate controlling the capturing and storing of electrical energy, the battery system 12 may additionally include a control module 24. More specifically, the control module 24 may control operations of components in the battery system 12, such as relays (e.g., switches) within the energy storage component 13, the alternator 15, and/or the electric motor 17. For example, the control module 24 may regulate an amount of electrical energy captured/supplied by each battery module 20 or 22 (e.g., to de-rate and re-rate the battery system 12), perform load balancing between the battery modules 20 and 22, determine a state of charge of each battery module 20 or 22, determine a temperature of each battery module 20 or 22, control voltage output by the alternator 15 and/or the electric motor 17, and the like.

Accordingly, the control module 24 may include one or more processor 26 and one or more memory 28. More specifically, the one or more processor 26 may include one or more application specific integrated circuits (ASICs), one or more field programmable gate arrays (FPGAs), one or more general purpose processors, or any combination thereof. Additionally, the one or more memory 28 may include volatile memory, such as random access memory (RAM), and/or non-volatile memory, such as read-only memory (ROM), optical drives, hard disc drives, or solid-state drives. In some embodiments, the control module 24 may include portions of a vehicle control unit (VCU) and/or a separate battery control module.

Figure 3:
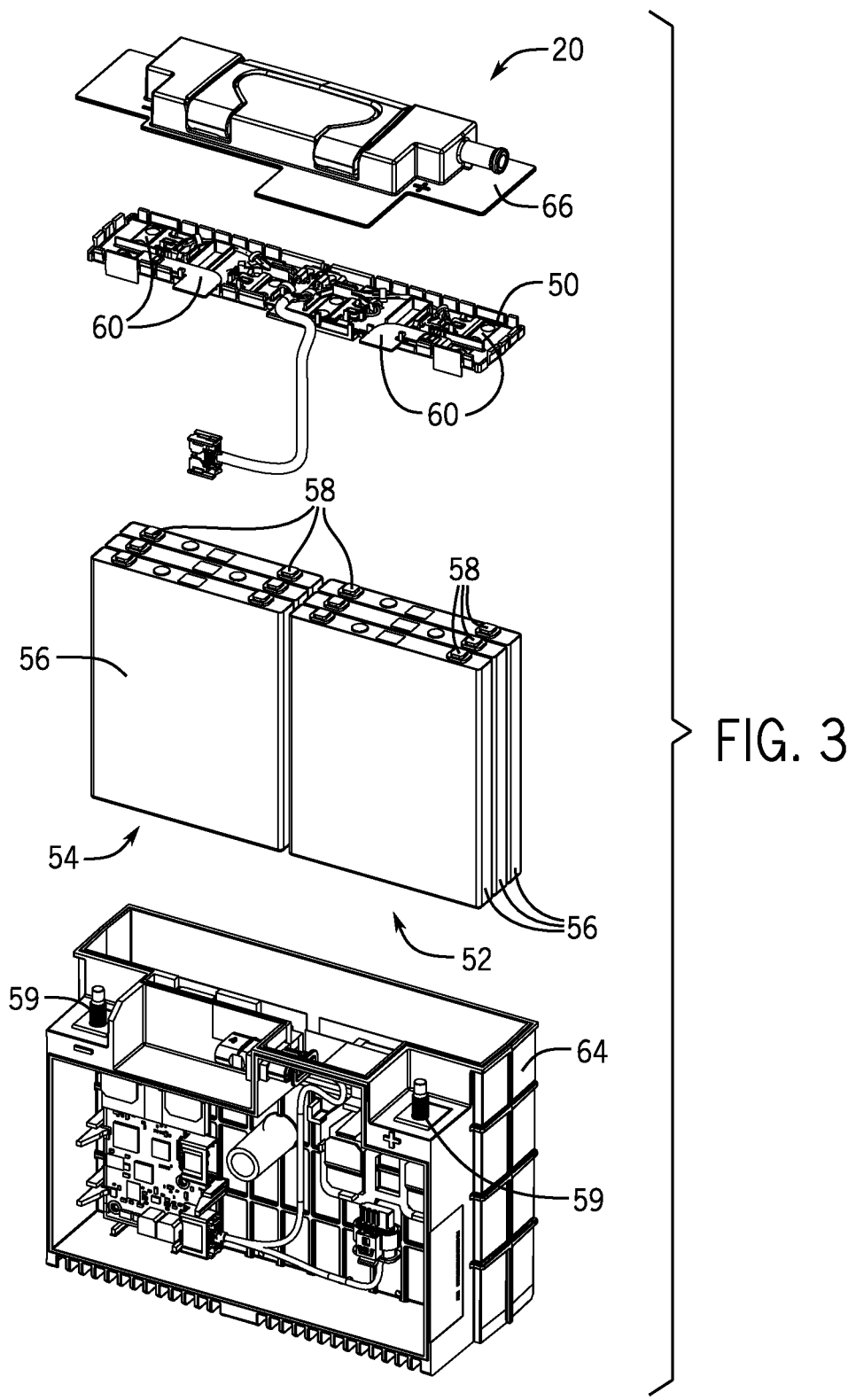
FIG. 3 is an exploded perspective view of an embodiment of a battery module that may include an enhanced weld between a bus bar and a sensing component, in accordance with an aspect of the present disclosure.

As discussed above, the battery module 20 may include one or more battery cells (e.g., electrochemical battery cells). In some cases, the battery cells may be subject undesirable levels of mechanical and/or electrical stress. Therefore, the battery module 20 may include sensing components to monitor a temperature and/or a voltage of the one or more battery cells, the sensing components being secured to bus bars using the improved processes described herein. In certain embodiments, it may be desirable to couple the sensing components to a bus bar, which may couple the one or more battery cells to one another. To decrease the assembly time of the battery module 20, the battery module 20 may include a bus bar carrier 50, which may receive the bus bars and the sensing components as shown in FIG. 3. Further, as discussed in more detail with reference to FIGS. 7-12, an improved welding process may enhance the strength of the connection between the bus bars and the sensing components.

For example, FIG. 3 is an exploded perspective view of the battery module 20 having a first battery cell stack 52 and a second battery cell stack 54, each having individual battery cells 56. Cell terminals 58 of the individual battery cells 56 may be electrically coupled to module terminals 59 via one or more bus bars 60. In some cases, one of the bus bars 60 may be welded to one of the battery cell terminals 58 to form an electrical connection (e.g., via a physical connection). Welding the bus bar 60 to the battery cell terminal 58 in accordance with present embodiments may form a robust electrical connection that may withstand vibrations and/or other movement that the battery module 20 may incur. Additionally, the battery module 20 may include the bus bar carrier 50, which may include the bus bars 60 configured to establish an electrical connection between the individual battery cells 56 and/or between the battery cells 56 and an external load (e.g., the xEV 10).

The illustrated embodiment of FIG. 3 also illustrates a housing 64 of the battery module 20, which may receive the first and second battery cell stacks 52, 54. Additionally, the battery module 20 may include a cover 66 for the housing 64. When the battery cells 56 and/or the bus bar carrier 50 are positioned within the housing 64, the cover 66 may be disposed on the housing 64 to enclose the battery module 20 and form a single, integrated unit that may provide power to a load (e.g., the xEV 10).

Figure 4:
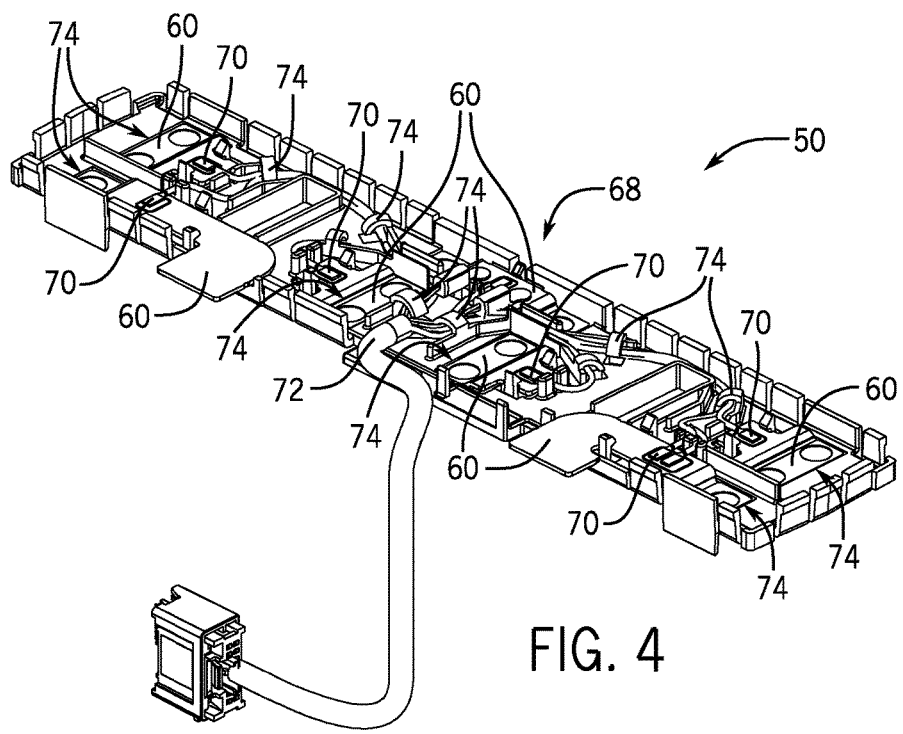
FIG. 4 is an expanded view of a first face of a bus bar carrier of the battery module of FIG. 3, the view showing the bus bars and the sensing components coupled to one another, in accordance with an aspect of the present disclosure.

To establish an electrical connection between the individual battery cells 56 and/or between the battery cells 56 and the load (e.g., the xEV 10), the terminals 58 of the battery cells 56 may be coupled (e.g., welded) to one or more of the bus bars 60 disposed in the bus bar carrier 50. For example, FIG. 4 is a perspective view of a first face 68 of the bus bar carrier 50 that includes the bus bars 60. The bus bars 60 may be disposed over the terminals 58 of the battery cells 56 to couple the battery cells 56 to one another. In certain embodiments, the bus bars 60 are welded (directly or indirectly) to the cell terminals 58 such that a physical and/or an electrical connection are established between the bus bars 60 and the cell terminals 58. The bus bars 60 may be coupled to the cell terminals 58 via a lap weld or any other suitable coupling technique.

The interconnection of the battery cells 56 using the bus bars 60 may enable a plurality of series and/or parallel connections to be made, resulting in a predetermined voltage and/or capacity of the overall battery module 20. In certain embodiments (e.g., the embodiment of FIG. 3), the battery module 20 may have, for example, six battery cells 56 connected in series to produce a voltage output that is the sum of the individual voltages of the battery cells 56, and a capacity substantially equal to the capacity of an individual battery cell 56 (e.g., 12V, 10 Ah). Other electrical connections, such as one or more parallel connections, may affect the voltage and capacity. In other embodiments, the battery module 20 may include less than six battery cells (e.g., 5, 4, 3, 2, or 1) or more than six battery cells (e.g., 7, 8, 9, 10, 12, 15, 20, 25, 30, 35, 40, 45, 50, or more) to produce embodiments of the battery module 20 having different voltages (e.g., 48 V) and/or different capacities (e.g., 20 Ah).

In addition to forming the electrical connections using the bus bars 60 of the bus bar carrier 50, the bus bar carrier 50 also includes various sensing components 70 (e.g., voltage sense components, temperature sense components, and/or other sensors) configured to enable the control module 24 (e.g., controller or battery management system "BMS") of the battery module 20 to perform monitoring functions with respect to the battery cells 56 and the battery module 20. The sensing components 70 (e.g., sensors) may include voltage sense components (e.g., an electrical lead carrying a signal to the control module 24), which are configured to sense voltages at each bus bar 60, as well as one or more temperature sense components (e.g., a thermocouple and/or a thermistor), which are configured to sense temperatures within the battery module 20, for example at certain bus bars 60. The sensing components 70 may be coupled to cabling 72 configured to carry signals generated by the sensing components 70 to the control module 24 (e.g., the BMS). For example, the sensing components 70 may be electrically coupled to the control module 24 (e.g., via the cabling 72) and configured to send signals pertaining to a temperature and/or a voltage of the battery module 20 (or individual battery cells 56) over time. In certain embodiments, the control module 24 may include a threshold temperature and/or voltage value stored in the memory 28. If a signal received from the sensing components 70 exceeds the threshold value, the control module 24 may be configured to disconnect a flow of electricity between the battery module 20 and a load, for example.

In certain embodiments, the bus bars 60, the sensing components 70, and the cabling 72 are all integrated onto a one-piece structure (e.g., the bus bar carrier 50) configured to carry and integrate these components to form a bus bar and sensing assembly. Additionally, the bus bar carrier 50 may include physical features 74 (e.g., interfaces, grooves, slots, protrusions, cantilevered hooks, channels, guides and/or light press fit interfaces) that may be configured to receive the bus bars 60, the sensing components 70, and/or the cabling 72, as well as position the bus bars 60, the sensing components 70, and/or the cabling 72 in a predetermined location (e.g., bus bars directly over the terminals 58 of the battery cells 56). Accordingly, during assembly of the battery module 20, the bus bars 60, the sensing components 70, and/or the cabling 72 may simply be aligned with the physical features 74 such that the bus bars 60, the sensing components 70, and/or the cabling 72 are positioned in the predetermined location.

Figure 5:
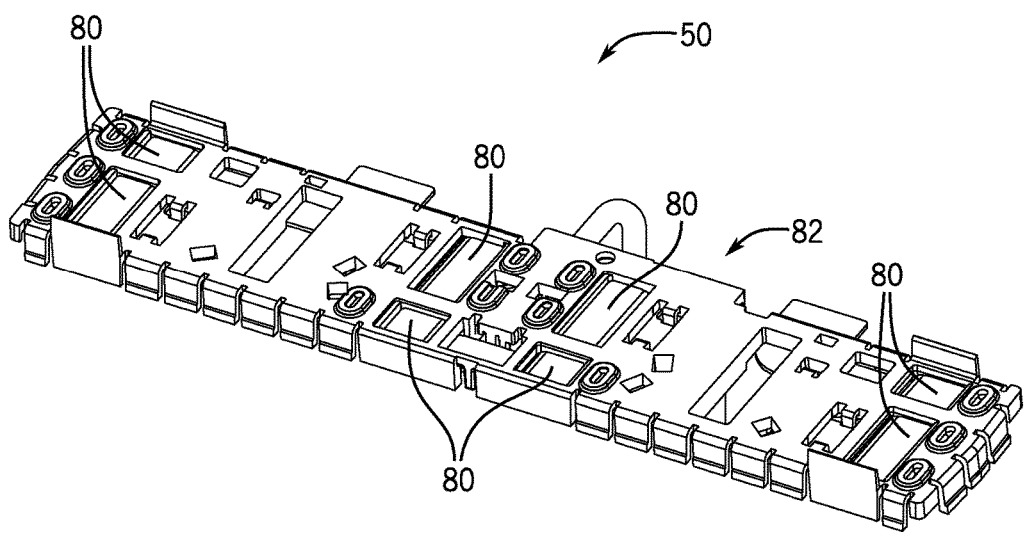
FIG. 5 is a perspective view of a second face of the bus bar carrier of FIG. 4 that includes welding access points, in accordance with an aspect of the present disclosure.

As depicted in FIG. 5, in addition to having the physical features 74, the bus bar carrier 50 may also include access points 80 (e.g., openings) that facilitate access to the bus bars 60 for a welding device (e.g., an ultrasonic welding anvil). For example, as shown in FIG. 5, a second face 82 of the bus bar carrier 50 includes the access points 80. In certain embodiments, the access points 80 may enable an assembler to couple the sensing components 70 to the bus bars 60 before disposing the bus bar carrier 50 (and the bus bars 60) over the terminals 58 of the battery cells 56. Accordingly, the access points 80 may facilitate assembly of the battery module 20 by enabling the assembler to couple components of the bus bar carrier 50 to one another prior to positioning the bus bar carrier 50 in the housing 64 of the battery module 20.

In certain embodiments, the sensing components 70 and the bus bars 60 may be disposed in the bus bar carrier 50. Additionally, a welding device (e.g., an ultrasonic welding anvil) may be utilized to couple the sensing components 70 to the bus bars 60 to form a physical connection between the sensing components 70 and the bus bars 60. The physical connection may ensure a robust electrical connection between the sensing components 70 and the bus bars 60 such that the sensing components 70 may accurately monitor a temperature and/or a voltage of one or more of the battery cells 56 at the bus bars 60.

Figure 6:
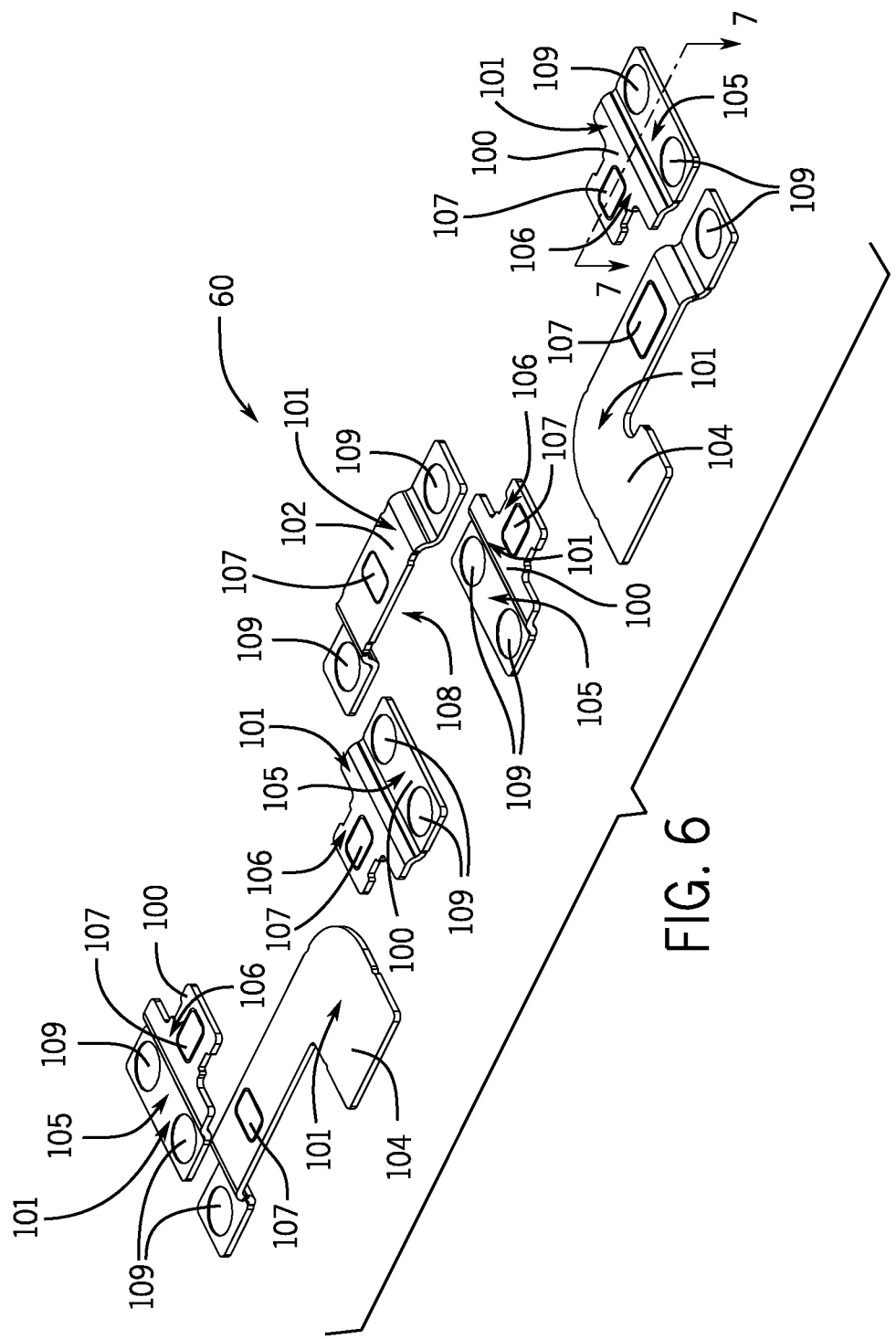
FIG. 6 is a perspective view of the bus bars of FIG. 4 that may be used in the battery module FIG. 3, including a cell-to-cell bus bar, a stack-to-stack bus bar, and a cell-to-load bus bar, in accordance with an aspect of the present disclosure.

The bus bars 60 may be configured to electrically couple individual battery cells 56 to one another as well as to electrically couple the battery cells 56 to a load. In certain embodiments, the battery module 20 may include different types of bus bars (e.g., different shapes, sizes, and/or materials). For example, FIG. 6 is a perspective view of an example of the bus bars 60 that may be used in the embodiment of the battery module 20 of FIG. 3, including a cell-to-cell bus bar 100 (FIG. 6 includes a first cell-to-cell bus bar and a second cell-to-cell bus bar), a stack-to-stack bus bar 102, and a cell-to-load bus bar 104 (FIG. 6 includes a first cell-to-load bus bar and a second cell-to-load bus bar). In the illustrated embodiment of FIG. 6, the bus bars 60 are arranged for a battery module 20 that includes six electrochemical battery cells 56. However, the three types of bus bars 100, 102, and 104 may be utilized in a battery module having more than six battery cells (e.g., 7, 8, 9, 10, or more) or less than six battery cells (e.g., 5, 4, 3, 2, or 1).

The cell-to-cell bus bar 100 may be utilized to establish an electrical connection between two battery cells 56 that are positioned adjacent to one another, adjacent within a stack, or adjacent across stacks, for example. When the battery cells 56 are in a series arrangement, the cell-to-cell bus bar 100 may be coupled (e.g., welded) to a positive terminal of a first battery cell of the battery cells 56 and to a negative terminal of a second battery cell of the battery cells 56, which is adjacent to the first battery cell 56. Conversely, when the battery cells 56 are in a parallel configuration, the cell-to-cell bus bar 100 may be coupled (e.g., welded) to a positive terminal of the first battery cell of the battery cells 56 and to a positive terminal of the second battery cell of the battery cells 56. Similarly, the cell-to-cell bus bar 100 may be coupled to respective negative terminals of the first battery cell and the second battery cell of the battery cells 56 to establish a parallel configuration.

In certain embodiments, the cell-to-cell bus bars 100 may include a shape that enables the cell-to-cell bus bar 100 to electrically couple two battery cells 56 as well as to provide a platform for the sensing components 70 to monitor the temperature and/or voltage at the cell-to-cell bus bar 100. For example, in the illustrated embodiment of FIG. 6, when viewed from overhead, the cell-to-cell bus bars 100 include a T-shape. In certain embodiments, the cell-to-cell bus bars 100 may include a body 101 that includes two portions. The T-shape may have a first portion 105 configured to couple respective cell terminals 58 of two or more of the battery cells 56 to one another and a second portion 106 configured to receive one or more of the sensing components 70 (e.g., a voltage and/or temperature sensing component). As shown in the illustrated embodiment of FIG. 6, the first portion 105 and the second portion 106 may be angled relative to one another (e.g., orthogonal).

In certain embodiments, the second portion 106 may include an indicator 107. The indicator 107 may provide a visual target (e.g., a predetermined location associated with a visual indication) for positioning the sensing component 70 prior to coupling (e.g., welding) the sensing component 70 to the bus bar 100. In certain embodiments, the indicator 107 may be stamped into the bus bars 60 (e.g., scoring). In other embodiments, the indicator may be formed by partially cutting through the thickness of the bus bars 60. In the illustrated embodiment of FIG. 6, the indicator 107 may include a rectangular shape. However, the indicator 107 may include any suitable shape such as a circle, an oval, or a square, for example.

The stack-to-stack bus bar 102 may be included in the battery module 20 when more than one battery cell stack (lineup) is utilized (e.g., the first and second battery cell stacks 52, 54). For example, in embodiments where only one of the first and second battery cell stacks 52, 54 is utilized in the battery module 20, the stack-to-stack bus bar 102 may not be included because no electrical connection between the first and second battery cell stacks 52, 54 is established. However, in embodiments that include more than one battery cell stack (e.g., the first and second battery cell stacks 52, 54), the stack-to-stack bus bar 102 may be utilized to establish a connection between the first and second battery cell stacks 52, 54. Similar to establishing an electrical connection between individual battery cells 56, the first and second battery cell stacks 52, 54 may be connected in series or in parallel. For example, a negative terminal of a first battery cell of the battery cells 56 of the first battery cell stack 52 may be coupled to a positive terminal of a second battery cell of the battery cells 56 of the second battery cell stack 54 to couple the first and second battery cell stacks 52, 54 in series. Conversely, the first and second battery cell stacks 52, 54 may be electrically coupled (e.g., welded to the stack-to-stack bus bar 102) via a negative terminal of a battery cell of each of the first and second battery cell stacks 52, 54 or a positive terminal of a battery cell of each of the first and second battery cell stacks 52, 54 to couple the first and second battery cell stacks 52, 54 in parallel.

In certain embodiments, the stack-to-stack bus bar 102 may include the body 101, which may be substantially planar. However, in certain embodiments, the body 101 may include an elevated portion 108 that enables the stack-to-stack bus bar 102 to extend across the first and second battery cell stacks 52, 54 as well as over obstructing features present within the battery module 20, such as obstructions caused by the bus bar carrier 50. For example, the bus bar carrier 50 may include various ridges and/or protrusions (e.g., the physical features 74) to facilitate placement of the sensing components 70 on the bus bar carrier 50 and/or to enable an interlocking connection with the cover 66. Accordingly, the elevated portion 108 may enable the stack-to-stack bus bar 102 to physically avoid such features and establish an electrical connection between the first and second battery cell stacks 52, 54. The stack-to-stack bus bar 102 may also provide some level of protection if cabling is positioned (e.g., routed) underneath the elevated portion 108.

Additionally, the stack-to-stack bus bars 102 may include one or more of the indicators 107, similar to the cell-to-cell bus bars 100. In certain embodiments, the stack-to-stack bus bars 102 may be coupled to the sensing components 70 at the one or more indicators 107. For example, the stack-to-stack bus bars 102 may be coupled to a voltage sense component and a temperature sense component to monitor a voltage and a temperature between the first and second battery cell stacks 52, 54 coupled to one another via the stack-to-stack bus bar 102. In other embodiments, the stack-to-stack bus bars 102 may be coupled to a voltage sense component or a temperature sense component.

The cell-to-load bus bar 104 may be utilized to couple the battery cells 56 and/or the battery cell stacks 52, 54 to a load (e.g., the xEV 10 of FIGS. 1 and 2). For example, the cell-to-load bus bar 104 may be directly coupled (e.g., welded) to the terminal 58 of a battery cell 56 and the battery module terminal (see FIG. 3). The battery module 20 may also include a positive terminal and a negative terminal, which may supply electrical power (e.g., cumulative from each of the battery cells 56) to a load (e.g., the xEV 10). Accordingly, two cell-to-load bus bars 104 may be included in the battery module 20 (e.g., one for the positive battery module terminal and one for the negative battery module terminal). In certain embodiments, the cell-to-load bus bars 104 may be substantially J-shaped (or L-shaped) such that the cell-to-load bus bar 104 may physically contact the terminal 58 of an individual battery cell 56 as well as the battery module terminal or a terminal shunt of the battery module 20. In other embodiments, the cell-to-load bus bar 104 may include any suitable shape that enables a connection between the battery module terminal and the terminal 58 of a battery cell 56.

Additionally, the cell-to-load bus bars 104 may include one or more of the indicators 107, similar to the cell-to-cell bus bars 100 and the stack-to-stack bus bars 102. In certain embodiments, the cell-to-load bus bars 104 may be coupled to the sensing components 70 at the one or more indicators 107. For example, the cell-to-load bus bars 104 may be coupled to a temperature sense component to monitor a temperature between the first or second battery cell stacks 52, 54 and the load (e.g., the xEV 10) that are coupled to one another via the cell-to-load bus bar 104. In other embodiments, the stack-to-stack bus bars 102 may be coupled to a voltage sense component and/or a temperature sense component.

As shown in the illustrated embodiment of FIG. 6, the bus bars 60 (e.g., the cell-to-cell bus bars 100, the stack-to-stack bus bars 102, and/or the cell-to-load bus bars 104) may include indentations 109. In certain embodiments, the indentations 109 may be stamped into the bus bars 60. In other embodiments, the indentations 109 may be formed by partially cutting through the thickness of the bus bars 60. The indentations 109 may provide a target for performing a weld that establishes a physical connection (and thus an electrical connection) between the bus bars 60 (e.g., the cell-to-cell bus bars 100, the stack-to-stack bus bars 102, and/or the cell-to-load bus bars 104) and the cell terminals 58. In the illustrated embodiment of FIG. 6, the indentations 109 include a circular shape. However, the indentations 109 may include any suitable shape such as an oval, a rectangle, or a square, for example.

Figure 7:
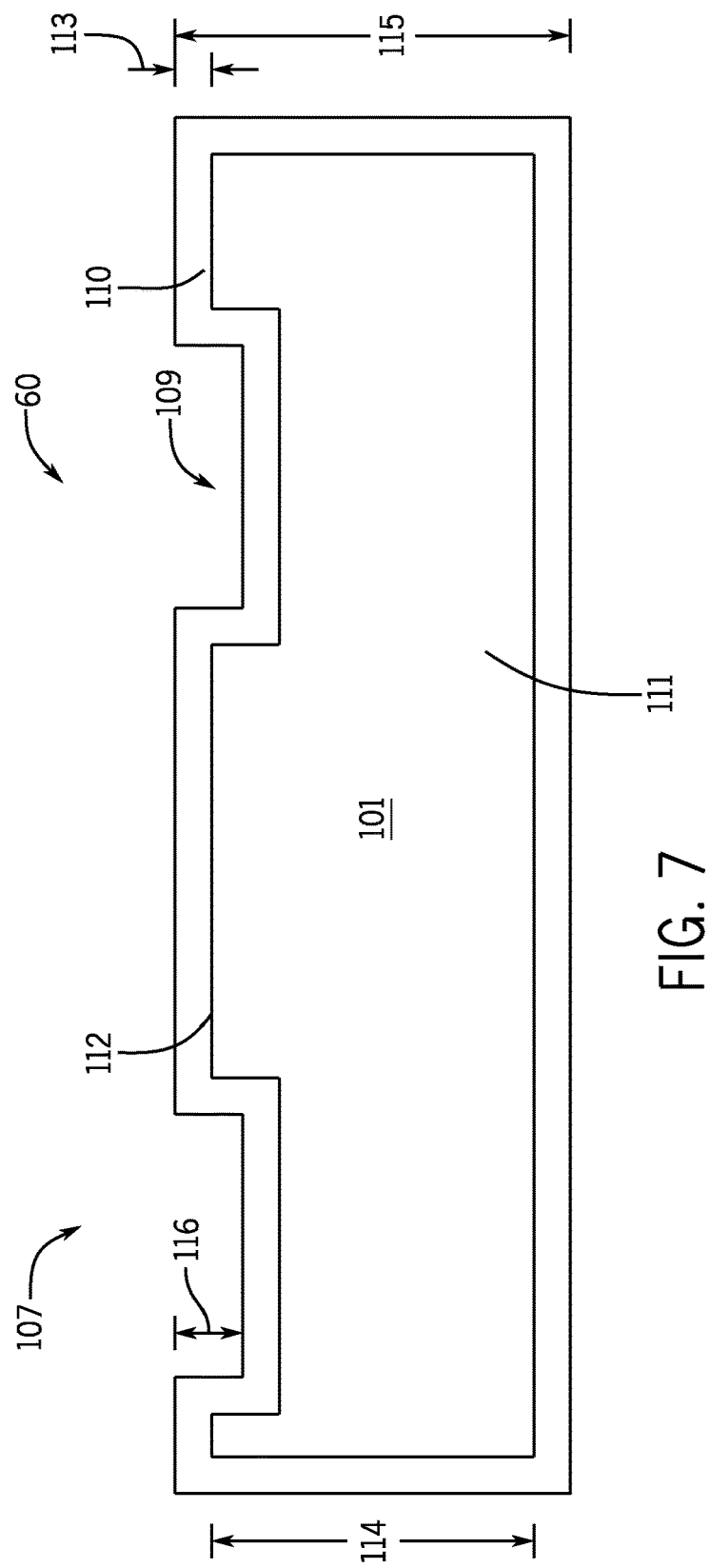
FIG. 7 is a cross section of one of the bus bars of FIG. 6, in accordance with an aspect of the present disclosure.

In accordance with certain embodiments, it is now recognized that a direct weld between the bus bars 60 and the cell terminals 58 and/or a direct weld between the bus bars 60 and the sensing components 70 may not form a strong physical and/or electrical connection. Therefore, the bus bars 60 may be coated with a plating (e.g., a nickel plating 110) to enhance the strength of the weld between the bus bars 60 and the cell terminals 58 and/or the weld between the bus bars 60 and the sensing components 70. The nickel plating 110 of the bus bars 60 is illustrated in FIG. 7, which is a cross section of one of the bus bars 60. For example, the bus bars 60 may have a base material 111 forming the general shape of the body 101, the base material 111 including a first material. Additionally, the body 101 may be coated with the nickel plating 110 (e.g., a nickel material that may include phosphorous). As shown in the illustrated embodiment of FIG. 7, the nickel plating 110 is disposed over an entire perimeter 112 of the bus bars 60, including the indentation 109 and the indicator 107. In other embodiments, the nickel plating 110 may be disposed over a portion of the perimeter 112 (e.g., a first surface of the body 101). In still further embodiments, the nickel plating 110 may be over only the indentation 109 and/or the indicator 107. Therefore, in such embodiments, the indentation 109 and/or the indicator 107 may include the nickel plating 110, and the remainder of the body 101 may include the first material (e.g., aluminum alloy).

In certain embodiments, the nickel plating 110 may be a coating on the bus bars 60 configured to enhance a physical strength of the weld between the bus bars 60 and the cell terminals 58 and/or the weld between the sensing components 70 and the bus bars 60. For example, during the welding process, a temperature of the weld materials (e.g., bus bars 60, the cell terminals 58, and/or the sensing components 70) may increase. Accordingly, at least a portion of one or more of the materials may melt to form a weld between the two components (e.g., the bus bars 60 and the cell terminals 58 and/or the bus bars 60 and the sensing components 70). When the nickel plating 110 is utilized on the bus bars 60, the strength of the weld may be enhanced because nickel may be more compatible to weld with the material of the cell terminals 58 and/or the sensing components 70 compared to the base material 111 of the bus bars 60 (e.g., aluminum). Additionally, the nickel plating 110 may include a predetermined thickness, which may enable a stronger (e.g., more corrosion resistant) weld. For example, in certain embodiments, the thickness of the nickel plating 110 may be between 0.2% and 20% of a combined thickness of the base of the bus bars 60 (e.g., between 4 micrometers and 8 micrometers). However, in a general sense, the nickel plating 110 may be any suitable thickness that may enable a stronger weld to be formed between the bus bars 60 and the cell terminals 58 and/or between the bus bars 60 and the sensing components 70.

In certain embodiments, the nickel plating 110 may include a concentration of phosphorous. The phosphorous may further enhance a strength of the weld between the bus bars 60 and the cell terminals 58 and/or between the bus bars 60 and the sensing components 70, for example by decreasing a susceptibility of the weld to cracking. Additionally, phosphorous may be included in the nickel plating 110 to enhance aesthetic qualities of the bus bars 60 and/or the resulting weld. In certain embodiments, the nickel plating 110 disposed on the bus bars 60 (e.g., the cell-to-cell bus bars 100, the stack-to-stack bus bars 102, and/or the cell-to-load bus bars 104) may have a concentration of phosphorous between 1 weight percent (wt. %) and 15 wt. %.

In accordance with the present disclosure, any technique for coating the bus bars 60 with nickel may be used. In certain embodiments, the bus bars 60 may be coated with the nickel plating 110 via an electroless nickel plating technique. Accordingly, nickel may be deposited on the base material 111 of the bus bars 60 via a chemical reaction between a reducing agent and metal ions, for example. Electroless plating techniques dispose the nickel plating 110 onto the base material 111 generally without an electrical charge placed within a coating solution. Rather, chemical reduction and oxidation reactions are facilitated by chemical reducing and oxidizing agents (e.g., as opposed to utilizing electrochemical redox reactions that occur as a result of an applied electrical potential). In certain embodiments, electroless plating may create a uniform coating of nickel onto the base layer, where the uniform coating includes a predetermined thickness. In certain embodiments, the nickel plating thickness may be between 1 and 15 micrometers (μm), between 2 and 10 μm, between 4 and 8 μm, or any suitable thickness that may enhance a strength of a weld between the cell terminals 58 and the bus bars 60 and/or between the bus bars 60 and the sensing components 70.

As shown in the illustrated embodiment of FIG. 7, the nickel plating 110 includes a thickness 113 that is uniform throughout the entire perimeter 112 of the bus bars 60. In other embodiments, the thickness 113 of the nickel plating 110 may vary throughout the perimeter 112, or the portion of the perimeter 112 that the nickel plating 110 is disposed on. As discussed above, the thickness 113 of the nickel plating 110 may be between 1 and 15 micrometers (μm), between 2 and 10 μm, or between 4 and 8 μm. Additionally, the body 101 may include a cross-sectional thickness 114. In certain embodiments, the thickness 114 of the body 101 may be predetermined based on an amount of desired energy that may be transferred through the bus bars 60 and toward the cell terminals 58 and/or the sensing components 70. The thickness 113 of the nickel plating 110 and the thickness 114 of the body 101 may form an overall thickness 115 of the bus bars 60. The overall thickness 115 may include the thickness 114 of the body 101 as well as the thickness 113 of the nickel plating 110 disposed on both top and bottom surfaces of the bus bars 60 (e.g., when the nickel plating 110 is disposed around the entire perimeter 112 of the bus bars 60).

The illustrated embodiment of FIG. 7 also illustrates that the indicator 107 includes a depth 116. In certain embodiments, the depth 116 of the indicator may be sufficiently deep such that the indicator 107 may easily be perceived by the assembler, such that the assembler knows where to place the sensing components 70 on the bus bars 60.

Figure 8:
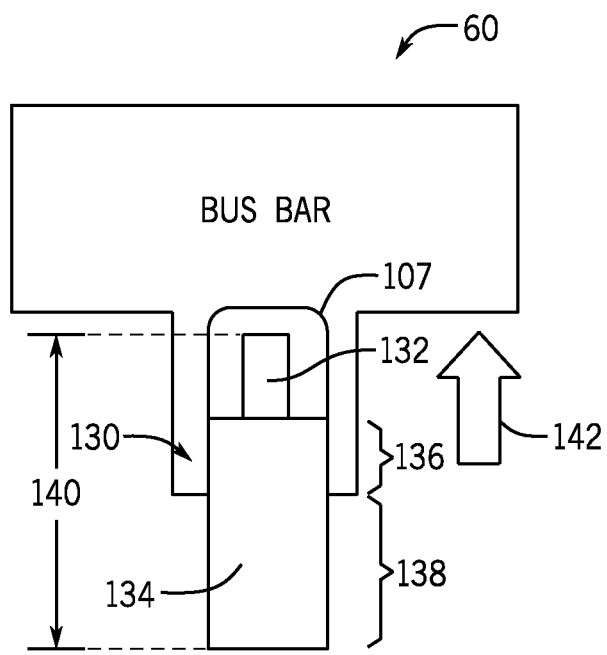
FIG. 8 is a plan view of an embodiment of a bus bar coupled to a voltage sense component at an indicator, in accordance with an aspect of the present disclosure.

For example, FIG. 8 is a plan view of a bus bar 60 having a voltage sense component 130 (e.g., an electrical lead carrying a signal to the control module 24) disposed over the indicator 107. As shown in the illustrated embodiment of FIG. 8, the voltage sense component 130 includes a lead portion 132 and an insulative portion 134. In certain embodiments, the lead portion 132 may include a 7-strand copper wire. In other embodiments, the lead portion 132 may include any suitable wire or device capable of carrying a signal representative of a voltage of one or more of the battery cells 56 to the control module 24. A weld may be formed between the lead portion 132 and the bus bar 60, such that the lead portion 132 contacts the bus bar 60 at the indicator 107. In certain embodiments, an ultraviolet ("UV") epoxy may be disposed over the lead portion 132 after the weld is formed between the voltage sense component 130 and the bus bars 60 to protect the lead portion 132 from damage due to conduction (e.g., damage may result when a temperature of the bus bars 60 substantially increases), abrasion, and so forth.

The insulative portion 134 may include a first segment 136 that contacts the bus bar 60 and a second segment 138 that does not contact the bus bar 60. The first segment 136 of the insulative portion 134 may prevent abrasion between the bus bar 60 and the voltage sense component 130. In other words, the first segment 136 contacting the bus bar 60 may create an enhanced connection between the bus bar 60 and the voltage sense component 130 because the voltage sense component 130 may be protected from damage due to abrasion that the bus bar 60 may cause. Accordingly, the duration of the connection between the bus bar 60 and the voltage sense component 130 may be enhanced. The second segment 138 of the insulative portion 134 may not contact the bus bar 60 and eventually couple the lead portion 132 to the control module 24 (see FIG. 2) or another computing device.

Further, the illustrated embodiment of FIG. 8 shows the voltage sense component 130 having a length 140 that extends in a direction 142. In certain embodiments, an ultrasonic weld may be formed between the bus bar 60 and the voltage sense component 130 such that a physical connection between the bus bar 60 and the lead portion 132 of the voltage sense component 130 may be established. Accordingly, the physical connection may enable the voltage sense component 130 to monitor a voltage of one or more of the battery cells 56 of the battery module 20. The ultrasonic weld may be formed by moving an ultrasonic welding anvil in a back-and-forth motion in the direction 142. By maintaining the motion of the ultrasonic welding anvil in a direction parallel to the length 140 of the voltage sense component 130, shear strain on the lead portion 132 is minimized.

Figure 9:
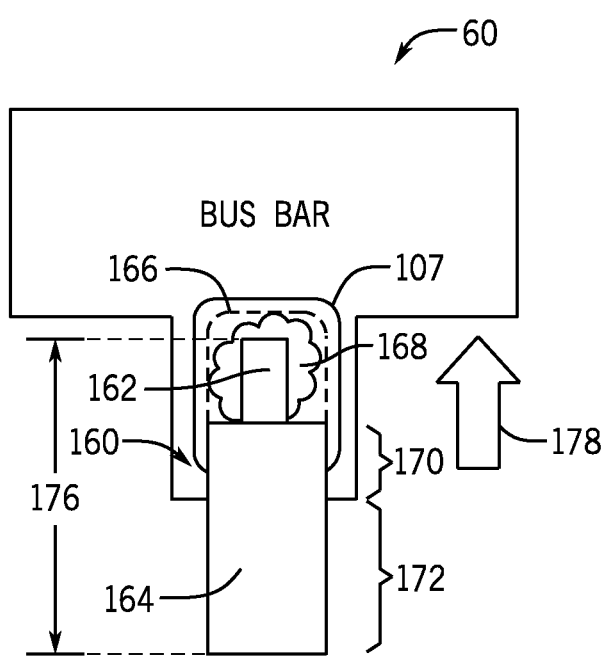
FIG. 9 is a plan view of an embodiment of a bus bar coupled to a temperature sense component at an indicator, in accordance with an aspect of the present disclosure.

While FIG. 8 illustrates an ultrasonic weld between the voltage sense component 130 and the bus bar 60, an ultrasonic weld may also be utilized to secure a temperature sense component 160 (e.g., a thermocouple and/or a thermistor) to the bus bar 60, as shown in FIG. 9. In certain embodiments, the temperature sense component 160 may also include a lead portion 162 and an insulative portion 164. However, the lead portion 162 may be covered by a lug 166. In certain embodiments, the lug 166 may include copper, aluminum, another metal, or any combination thereof. The lug 166 may be utilized to prevent direct contact between the lead portion 162 and the bus bar 60, such that the lead portion 162 may accurately detect a temperature of the bus bar 60 without interference. Additionally, the lug 166 may also protect the lead portion 162 from gases that may be generated in the battery module 20 and/or other contaminants that may be present in the battery module 20. Additionally, to secure the lead portion 162 within the lug 166, the lead portion 162 may be surrounded by UV epoxy 168. The film of the UV epoxy 168 surrounding the lead portion 162 within the lug 166 may also serve to protect the lead portion 162 from damage due to conduction (e.g., damage may result when a temperature of the bus bars 60 substantially increases). The lug 166 may be welded to the bus bar 60 and establish a connection between the lead portion 162 of the temperature sense component 160 and the bus bar 60 such that the temperature sense component 160 may accurately monitor the temperature of one or more of the battery cells 56.

The insulative portion 164 may also include a first segment 170 and a second segment 172. The first segment 170 may be configured to contact the bus bar 60 and to substantially prevent abrasion between the temperature sense component 160 and the bus bar 60. The second segment 172 of the insulative portion 164 may not contact the bus bar 60 and eventually couple the lead portion 162 to the control module 24 or another computing device. As shown in the illustrated embodiment of FIG. 9, the temperature sense component 160 includes a length 176 that extends in a direction 178. In certain embodiments, the lug 166 may be coupled to the bus bar 60 via an ultrasonic weld. In such embodiments, an ultrasonic weld anvil that may produce the ultrasonic weld between the lug 166 and the bus bar 60 may be moved in a back-and-forth motion in the direction 178. Accordingly, the ultrasonic welding anvil may avoid contact with the insulative portion 164 of the temperature sense component 160 to avoid tangling or other obstructions during the welding process. The welding process may produce a robust weld having enhanced strength, such that the sensing components 70 may be secured to the bus bars 60 to ensure accurate monitoring of the voltage and/or temperature of one or more of the battery cells 56.

Figure 10:
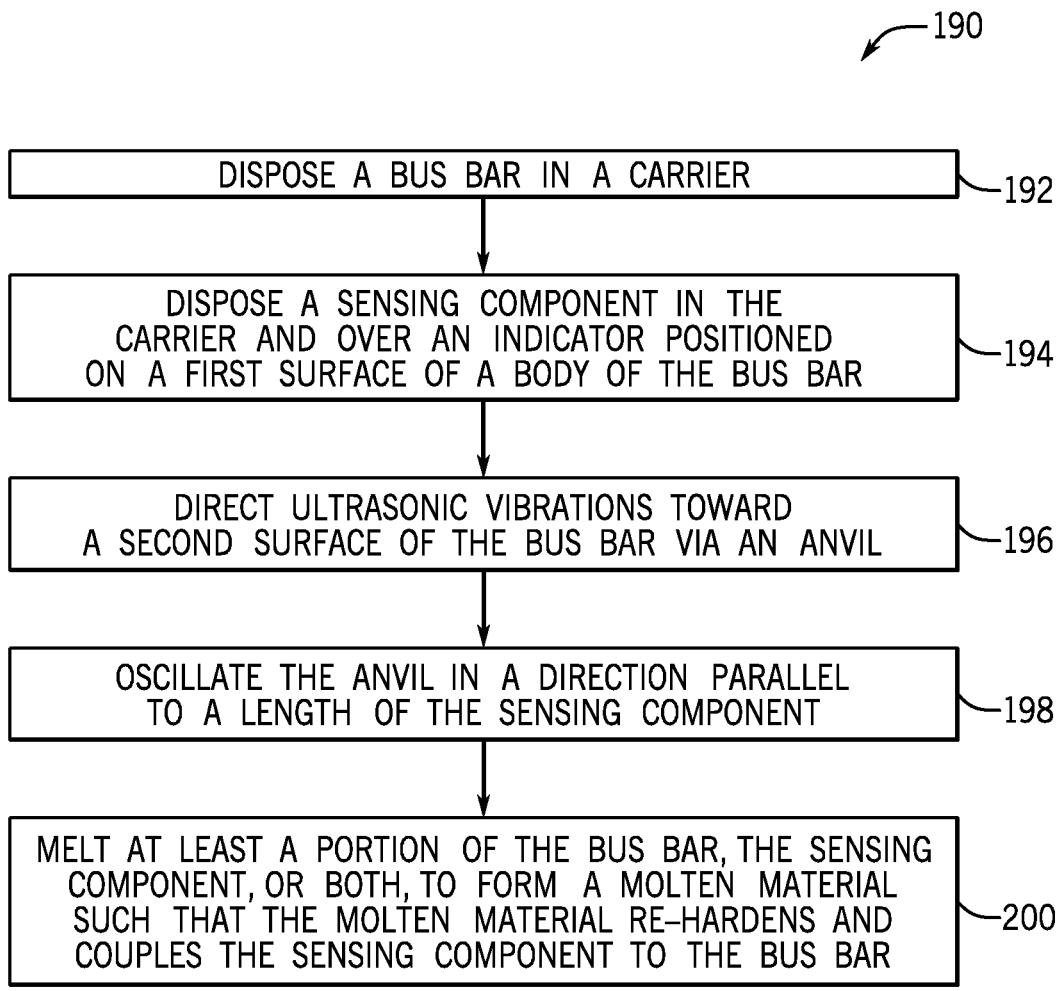
FIG. 10 is a block diagram of an embodiment of a process that may used to produce an enhanced weld between a bus bar and a sensing component, in accordance with an aspect of the present disclosure.

For example, FIG. 10 is a block diagram of a process 190 that may produce the ultrasonic weld between the sensing components 70 (e.g., the voltage sense component 130 and/or the temperature sense component 160) and the bus bar 60. At block 192, the bus bar 60 may be disposed in the bus bar carrier 50 and secured to the bus bar carrier 50 via the physical features 74 of the bus bar carrier 50. The physical features 74 of the bus bar carrier are described in more detail herein with reference to FIG. 11.

At block 194, the sensing components 70 (e.g., the voltage sense component 130 and/or the temperature sense component 160) may also be disposed in the bus bar carrier 50 and secured to the bus bar carrier 50 via the physical features 74. The sensing components 70 may be disposed over the indicator 107 as discussed below (e.g., the lead portion 132 of the voltage sense component 130 or the lug 166 of the temperature sense component 160 may be disposed over the indicator 107). In certain embodiments, a portion of a first surface of the bus bars 60 may contact the cell terminals 58, and a second surface, opposite the first surface, of the bus bars 60 may contact the sensing components 70.

At block 196, the sensing components 70 (e.g., the voltage sense component 130 and/or the temperature sense component 160) may be coupled to the bus bars 60 via an ultrasonic weld, for example. The ultrasonic weld may be formed by directing ultrasonic acoustic vibrations toward the second surface of the bus bars 60 (e.g., the surface facing the cell terminals 58) via an ultrasonic welding anvil. In certain embodiments, the ultrasonic acoustic vibrations may be directed toward the second surface to avoid direct contact between the ultrasonic acoustic vibrations and the sensing components 70 (e.g., the sensing components 70 may be sensitive to the ultrasonic acoustic vibrations). The ultrasonic welding anvil may be configured to produce the ultrasonic acoustic vibrations, which may transfer energy to the bus bars 60 and/or the sensing components 70. The energy transferred to the bus bars 60 and/or the sensing components 70 may increase a temperature of the bus bars 60 and/or a temperature of the sensing components 70.

At block 198, the ultrasonic welding anvil may be oscillated (e.g., moved in a back-and-forth motion) in the direction 142 and/or 178 parallel to the length of the sensing components 70 (e.g., the length 140 and/or the length 176). Accordingly, the ultrasonic welding anvil may not be obstructed by the sensing components 70 (e.g., the insulative portions 134 and/or 164) and shear strain on the sensing components 70 may be minimized.

At block 200, as the temperature of the bus bars 60 and/or the sensing components 70 increases due to the application of ultrasonic vibrations, at least a portion of the bus bars 60 and/or the sensing components 70 may begin to melt. As the portion of the bus bars 60 and/or the sensing components 70 melts, a molten material may form. When the ultrasonic welding anvil is removed from the second surface of the bus bars 60, such that the ultrasonic acoustic vibrations are no longer directed toward the second surface, the molten material may begin to re-harden as a temperature of the bus bars 60 and/or the sensing components 70 decreases. Accordingly, the molten material may harden, and thereby attach to both the bus bar 60 and the sensing components 70, coupling the sensing components 70 to the bus bar 60. Such a weld may enhance a robustness of the connection between the bus bar 60 and the sensing components 70, thereby enhancing a duration of the battery module 20.

Figure 11:
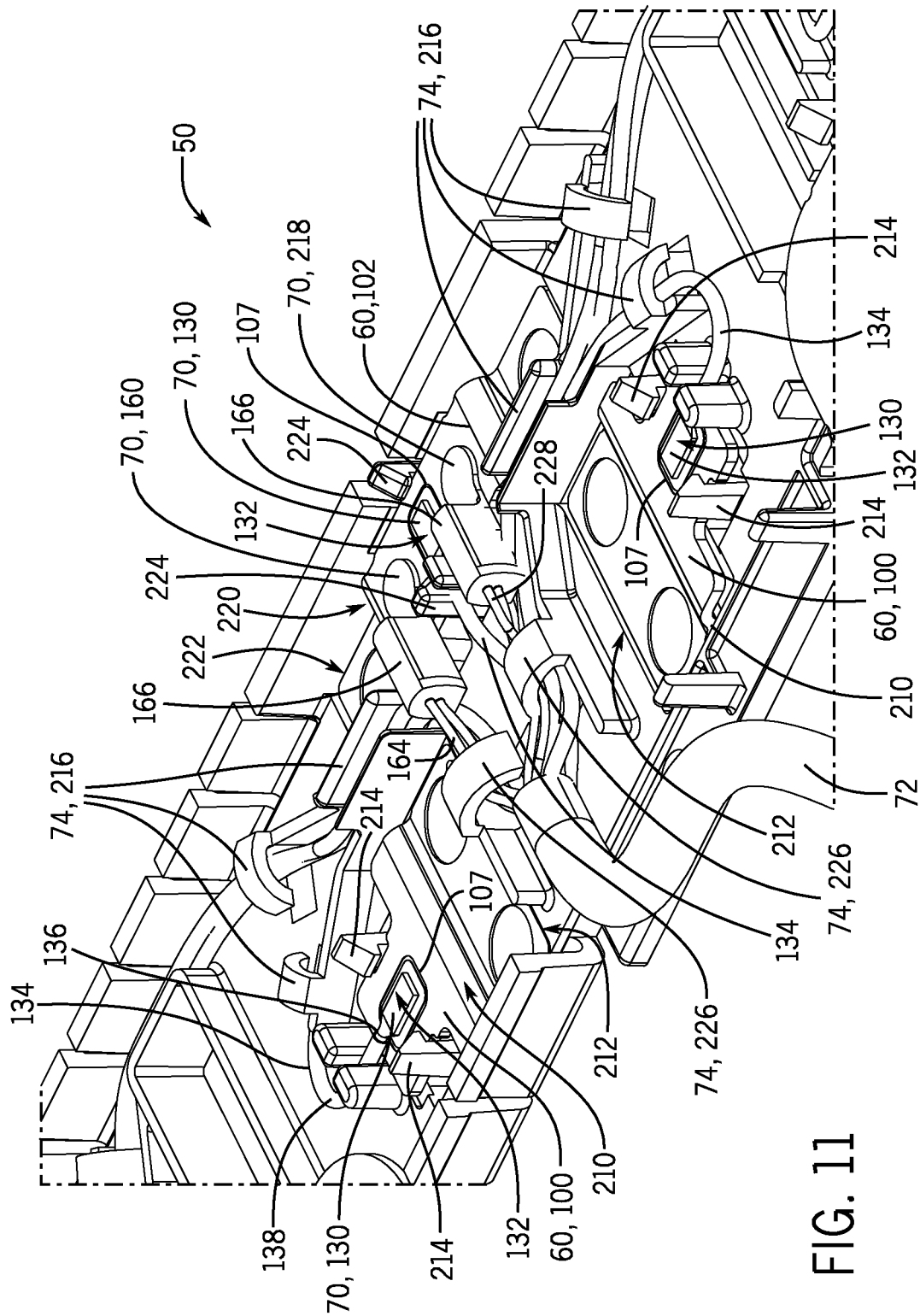
FIG. 11 is an expanded perspective view of the bus bar carrier of FIG. 3 having sensing components coupled to bus bars, the sensing components and the bus bars being held to the bus bar carrier using securement features of the bus bar carrier, in accordance with an aspect of the present disclosure.

FIG. 11 is a perspective view of the bus bar carrier 50 having the sensing components 70 (e.g., the voltage sense component 130 and the temperature sense component 160) coupled to the bus bars 60 via ultrasonic welds formed utilizing the process 190 of FIG. 10. For example, the voltage sense components 130 are shown coupled to the cell-to-cell bus bars 100 and to the stack-to-stack bus bar 102. Additionally, the lead portion 132 is disposed within the indicator 107 and the first segment 136 of the insulative portion 134 is contacting the cell-to-cell bus bar 100 and the stack-to-stack bus bar 102. Moreover, the illustrated embodiment of FIG. 11 shows that the bus bar carrier 50 includes the physical features 74 that may be utilized to receive and to secure the bus bars 60 and the sensing components 70.

For example, the cell-to-cell bus bars 100 are disposed in first interfaces 210 configured to receive the cell-to-cell bus bars 100. The first interfaces 210 may include first grooves 212 or recesses (e.g., grooves in the bus bar carrier 50 having a similar shape to the cell-to-cell bus bar 100) that may enable an assembler to place the cell-to-cell bus bars 100 into a predetermined location in the bus bar carrier 50 such that the cell-to-cell bus bars 100 are substantially aligned with the cell terminals 58. Additionally, the first interfaces 210 may include first protrusions 214 (e.g., cantilevered hooks) that may lock or secure the cell-to-cell bus bars 100 within the bus bar carrier 50. In certain embodiments, cell-to-cell bus bars 100 may be configured to snap into the first interfaces 210 by action of the first protrusions 214, such that the cell-to-cell bus bars 100 are substantially secure with respect to the bus bar carrier 50 (e.g., even before laser welding the cell-to-cell bus bar 100 to the cell terminals 58). Additionally, the first interfaces 210 may include snap-fit features to secure the cell-to-cell bus bars 100.

The bus bar carrier 50 also includes first securement features 216 (e.g., cantilevered hooks, protrusions, guides) configured to secure the insulative portions 134 of the voltage sense components 130 and to guide the insulative portions 134 along a predetermined path. In certain embodiments, the predetermined path of the insulative portions 134 may substantially eliminate any obstruction that the insulative portions 134 and/or any other portions of the voltage sense components 130 may create. For example, placing the insulative portions 134 of the voltage sense components 130 in the first securement features 216 prevents the insulative portions 134 from inadvertently creating an obstruction or other obstacle within the bus bar carrier 50. In other words, the first securement features 216 enable the insulative portions 134 to be guided in an organized manner along the predetermined path. Additionally, the first securement features 216 may position the voltage sense components 130 in a predetermined position with respect to the bus bar 60.

Additionally, FIG. 11 illustrates the temperature sense component 160 and an additional temperature sense component 218 coupled to the stack-to-stack bus bar 102. While the temperature sense components 160, 218 are shown as coupled to the stack-to-stack bus bar 102, the temperature sense components 160, 218 may also be coupled to the cell-to-cell bus bars 100 and/or the cell-to-load bus bars 104. As shown in the illustrated embodiment of FIG. 11, the bus bar carrier 50 also includes a second interface 220 configured to receive and secure the stack-to-stack bus bar 102. The second interface 220 may include a second groove 222 or recesses (e.g., a groove in the bus bar carrier 50 having a similar shape to the stack-to-stack bus bar 102). Additionally, the second interface 220 may include second protrusions 224 (e.g., cantilevered hooks) that may lock or secure the stack-to-stack bus bar 102 within the bus bar carrier 50. In certain embodiments, stack-to-stack bus bar 102 may be configured to snap into the second interface 220 such that the stack-to-stack bus bar 102 is substantially secure with respect to the bus bar carrier 50 (e.g., even before laser welding the stack-to-stack bus bar 102 to the cell terminals 58). Additionally, the second interfaces 220 may include snap-fit features to secure the stack-to-stack bus bars 102.

The bus bar carrier 50 also includes second securement features 226 (e.g., cantilevered hooks, protrusions, guides) to secure the insulative portion 164 of the temperature sense component 160 and an insulative portion 228 of the additional temperature sense component 218 within the bus bar carrier 50. The second securement features 226 may also guide the insulative portions 164, 228 along the predetermined path. In certain embodiments, the predetermined path may substantially eliminate any obstruction that the insulative portions 164, 228 and/or any other portions of the temperature sense components 160, 218 may create. For example, placing the insulative portions 164, 228 of the temperature sense components 160, 218 in the second securement features 226 may prevent the insulative portions 164, 228 from inadvertently creating an obstruction or other obstacle within the bus bar carrier 50. In other words, the second securement features 226 enable the insulative portions 164, 228 to be guided in an organized manner along the predetermined path. Additionally, the second securement features 226 may position the temperature sense components 160 in a predetermined position with respect to the bus bar 60.

As discussed above, the ultrasonic welds formed between the bus bars 60 and the sensing components 70 may be performed through the access points 80 in the bus bar carrier. Accordingly, the bus bars 60 and the sensing components 70 may be coupled to one another before the bus bar carrier 50 is disposed in the housing 64 of the battery module 20, thereby facilitating the assembly process. An example of the ultrasonic welds performed on the bus bars 60 are shown in FIGS. 12-15. For example, FIGS. 12 and 13 are pictorial representations of an example of an ultrasonic weld formed between the bus bar 60 and the voltage sense component 130. FIG. 12 shows a first surface 240 of the bus bar 60, and FIG. 13 shows a second surface 244 of the bus bar 60. As shown in FIG. 12, the first surface 240 may directly contact the lead portion 132 of the voltage sense component 130 in order to enable the voltage sense component 130 to accurate monitor a voltage of one or more of the battery cells 56. Additionally, the first segment 136 of the insulative portion 134 contacts the bus bar 60 and the second segment 138 extends in the direction 142 along the length 140 of the voltage sense component 130.

The second surface 244, as shown in FIG. 13, may be the surface that ultimately faces the cell terminals 58 when the bus bar carrier 50 is disposed in the housing 64 of the battery module 20. Additionally, the ultrasonic welding anvil may direct the ultrasonic acoustic vibrations at the second surface 244, thereby causing the temperature of the bus bar 60 and/or the lead portion 132 of the voltage sense component 130 to increase. As shown in the illustrated embodiment of FIG. 13, the second surface 244 may include a patterned effect 248 resulting from pressure applied during the welding process.

FIGS. 14 and 15 are pictorial representations of an example of an ultrasonic weld between the bus bar 60 and the temperature sense component 160. For example, FIG. 14 shows the first surface 240 of the bus bar 60, and FIG. 15 shows the second surface 244 of the bus bar 60. As shown in FIG. 14, the first surface 240 may directly contact the lug 166 of the temperature sense component 160 in order to enable the temperature sense component 160 to accurately monitor a temperature of one or more of the battery cells 56. In certain embodiments, the lug 166 may include copper, aluminum, another metal, or any combination thereof. Additionally, the first segment 170 of the insulative portion 164 contacts the bus bar 60 and the second segment 172 extends in the direction 178 along the length 176 of the temperature sense component 160.

The second surface 244 shown in FIG. 15 may be the surface that ultimately faces the cell terminals 58 when the bus bar carrier 50 is disposed in the housing 64 of the battery module 20. Additionally, the ultrasonic welding anvil may direct the ultrasonic acoustic vibrations at the second surface 244, thereby causing the temperature of the bus bar 60, the lug 166, and/or the lead portion 162 of the temperature sense component 160 to increase. As shown in the illustrated embodiment of FIG. 15, the second surface 244 may include a patterned effect 264 resulting from pressure applied during the welding process.

One or more of the disclosed embodiments, alone or in combination, may provide one or more technical effects useful in the manufacture of battery modules, and portions of battery modules. In general, embodiments of the present disclosure include an improved ultrasonic welding technique for creating a robust connection between sensing components and a bus bar of a battery module. The ultrasonic weld may be performed through an access point in a bus bar carrier to couple a sensing component to a bus bar at an indicator located on a body of the bus bar. Welds formed in accordance with the present disclosure may include an enhanced robustness as well as enhance the efficiency of an assembly process of the battery module. The technical effects and technical problems in the specification are exemplary and are not limiting. It should be noted that the embodiments described in the specification may have other technical effects and can solve other technical problems.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The invention claimed is:

1. A battery module, comprising:
a stack of battery cells disposed in a housing, wherein each battery cell of the stack of battery cells comprises a terminal;
a bus bar comprising a body and an indicator comprising an indentation formed onto the body, wherein the bus bar is configured to couple a first terminal of a first battery cell of the stack of battery cells to a second terminal of a second battery cell of the stack of battery cells;
a sensing component disposed in the indentation of the indicator and configured to monitor a condition of at least one battery cell of the stack of battery cells; and
a weld physically and electrically coupling the sensing component to the bus bar at the indicator.

2. The battery module of claim 1, wherein the indicator provides a visual target for a predetermined location of the sensing component.

3. The battery module of claim 1, wherein the sensing component is a temperature sense component configured to monitor a temperature of the battery cell of the stack of battery cells.

4. The battery module of claim 3, wherein the temperature sense component is disposed in a lug and surrounded by an ultraviolet (UV) epoxy, and wherein the weld directly couples the lug to the bus bar at the indicator.

5. The battery module of claim 1, wherein the sensing component is a voltage sense component configured to monitor a voltage of the battery cell of the stack of battery cells.

6. The battery module of claim 5, wherein the voltage sense component comprises a lead portion and an insulator material portion, wherein the weld directly couples the lead portion to the bus bar at the indicator, and wherein the weld is an ultrasonic weld performed along a direction parallel to the lead portion.

7. The battery module of claim 1, wherein the bus bar comprises a T-shape that includes a first portion configured to couple the first terminal to the second terminal and a second portion configured to couple to the sensing component.

8. The battery module of claim 1, wherein the bus bar comprises a J-shape configured to couple a third terminal of a third battery cell of the stack of battery cells to a module terminal of the battery module.

9. The battery module of claim 1, wherein the bus bar and the sensing component are held to a carrier of the battery module by securement features integrated into the carrier.

10. The battery module of claim 9, wherein the carrier comprises a recess configured to receive the bus bar.

11. The battery module of claim 9, wherein the securement features comprise a cantilevered hook.

12. The battery module of claim 9, wherein the carrier comprises a first surface that includes the securement features and a second surface configured to face the stack of battery cells, and wherein the carrier comprises an access point for a welding device on the second surface.

13. The battery module of claim 1, wherein the bus bar comprises nickel plating.

14. The battery module of claim 13 wherein a thickness of the nickel plating is between 4 micrometers (μm) and 8 μm.

15. A method of manufacturing a battery module, comprising:
disposing a bus bar in a carrier;
disposing a sensing component in the carrier and into an indicator comprising an indentation formed onto a body of the bus bar, wherein the indicator is positioned on a first surface of the bus bar, and wherein the sensing component is disposed in the indentation of the indicator;
directing ultrasonic vibrations toward a second surface of the bus bar via an anvil;
oscillating the anvil in a direction parallel to a length of the sensing component; and
melting at least a portion of the bus bar, the sensing component, or both, to form a molten material such that the molten material re-hardens and couples the sensing component to the bus bar.

16. The method of claim 15, wherein disposing the bus bar in the carrier comprises securing the bus bar in an interface of the carrier.

17. The method of claim 16, wherein the interface is a press fit interface.

18. The method of claim 15, wherein the sensing component comprises a temperature sense component.

19. The method of claim 18, comprising disposing the temperature sense component in a lug comprising an ultraviolet (UV) curable epoxy, and wherein disposing the sensing component in the carrier comprises disposing the lug directly on the indicator of the bus bar.

20. The method of claim 15, wherein the sensing component comprises a voltage sense component having a lead portion and an insulator material portion.

21. The method of claim 20, comprising disposing the lead portion of the voltage sense component directly on the indicator of the bus bar such that a segment of the insulator material portion contacts the bus bar.

22. A battery module, comprising:
a stack of battery cells disposed in a housing, wherein each battery cell of the stack of battery cells comprises a terminal;
a bus bar comprising a body and an indicator comprising an indentation formed onto the body, wherein the bus bar is configured to couple a first terminal of a first battery cell of the stack of battery cells to a second terminal of a second battery cell of the stack of battery cells;
a temperature sensing component disposed on the indicator and configured to monitor a condition of at least one battery cell of the stack of battery cells, wherein the temperature sensing component is configured to monitor a temperature of the battery cell of the stack of battery cells, and wherein the temperature sensing component is disposed in a lug and surrounded by an ultraviolet (UV) epoxy; and a weld physically and electrically coupling the temperature sensing component to the bus bar at the indicator, wherein the weld directly couples the lug to the bus bar at the indicator.

23. The battery module of claim 22, wherein the bus bar and the temperature sensing component are held to a carrier of the battery module by securement features integrated into the carrier.

24. The battery module of claim 23, wherein the carrier comprises a recess configured to receive the bus bar.

25. The battery module of claim 23, wherein the carrier comprises a first surface that includes the securement features and a second surface configured to face the stack of battery cells, and wherein the carrier comprises an access point for a welding device on the second surface.

* * * * *

UNITED STATES PATENT AND TRADEMARK OFFICE
CERTIFICATE OF CORRECTION

PATENT NO. : 10,062,931 B2
APPLICATION NO. : 14/872049
DATED : August 28, 2018
INVENTOR(S) : Matthew R. Tyler et al.

It is certified that error appears in the above-identified patent and that said Letters Patent is hereby corrected as shown below:

In the Specification

In Column 1, Line 42, delete "full hybrid systems" and insert -- full hybrid electric vehicles --, therefore.

In Column 1, Line 45, delete "mild hybrid systems" and insert -- mild hybrid electric vehicles --, therefore.

In Column 3, Line 28, delete "DRAWINGS" and insert -- BRIEF DESCRIPTION OF DRAWINGS --, therefore.

In Column 3, Line 52, delete "module FIG. 3," and insert -- module of FIG. 3, --, therefore.

In Column 3, Line 65, delete "may used" and insert -- may be used --, therefore.

In Column 7, Line 37, delete "may be subject" and insert -- may be subject to --, therefore.

Signed and Sealed this
Fifth Day of March, 2019

Andrei Iancu
*Director of the United States Patent and Trademark Office*